(12) United States Patent
Rombold et al.

(10) Patent No.: US 7,954,396 B2
(45) Date of Patent: Jun. 7, 2011

(54) RACK AND PINION STEERING GEAR WITH AUTOMATIC ADJUSTMENT OF THE THRUST ELEMENT

(75) Inventors: Manfred Rombold, Winnenden-Höten (DE); Michael Weigel, Chemnitz (DE)

(73) Assignee: ThyssenKrupp Presta Steertec GmbH (DE)

( * ) Notice: Subject to any disclaimer, the term of this patent is extended or adjusted under 35 U.S.C. 154(b) by 377 days.

(21) Appl. No.: 12/295,687

(22) PCT Filed: Jan. 25, 2007

(86) PCT No.: PCT/EP2007/000631
§ 371 (c)(1),
(2), (4) Date: Oct. 1, 2008

(87) PCT Pub. No.: WO2007/118524
PCT Pub. Date: Oct. 25, 2007

(65) Prior Publication Data
US 2009/0249902 A1 Oct. 8, 2009

(30) Foreign Application Priority Data

Apr. 4, 2006 (DE) .................. 10 2006 016 110

(51) Int. Cl.
*F16H 25/28* (2006.01)
(52) U.S. Cl. .............. 74/422; 74/409; 74/29; 74/388 PS
(58) Field of Classification Search ......... 74/29, 388 PS, 74/409, 422; 180/428; 280/93.514, 93.515; 254/104

See application file for complete search history.

(56) References Cited

U.S. PATENT DOCUMENTS

| | | | | |
|---|---|---|---|---|
| 2,871,848 A * | 2/1959 | Wall et al. | | 126/215 |
| 3,585,875 A | 6/1971 | Adams | | |
| 5,265,691 A | 11/1993 | Konishi et al. | | |
| 5,718,149 A * | 2/1998 | Phillips | | 74/422 |
| 5,931,046 A * | 8/1999 | Phillips | | 74/422 |
| 6,591,706 B2 * | 7/2003 | Harer et al. | | 74/422 |
| 7,654,166 B2 * | 2/2010 | Heo | | 74/409 |

FOREIGN PATENT DOCUMENTS

| | | |
|---|---|---|
| DE | 38 35 947 | 4/1990 |
| DE | 102 30 600 | 1/2004 |
| DE | 102 30 602 | 1/2004 |
| EP | 0 238 214 | 9/1987 |
| EP | 1 291 261 | 3/2003 |
| EP | 1 507 694 | 2/2005 |
| GB | 1 181 738 | 2/1970 |
| GB | 2 037 931 | 7/1980 |
| JP | 58020651 | 2/1983 |
| JP | 11222141 | 8/1999 |
| JP | 2002234448 | 8/2002 |

* cited by examiner

*Primary Examiner* — Richard W Ridley
*Assistant Examiner* — Terence Boes
(74) *Attorney, Agent, or Firm* — Robert W. Becker; Robert W. Becker & Assoc.

(57) ABSTRACT

A rack and pinion steering gear comprising a thrust element disposed in a housing for pressing a rack and pinion against one another. One side of the thrust element is supported against the rack, and another side is supported against a wedge-like part formed of two semi-circular annular elements, each of which is provided with at least one wedge surface that is disposed at an angle to a central plane of the wedge-like part. A side of the wedge-like part remote from the thrust element is supported against a set screw. The thrust element and/or the set screw is provided with an inclined surface that cooperates with the at least one wedge surface of the annular elements of the wedge-like part.

14 Claims, 4 Drawing Sheets

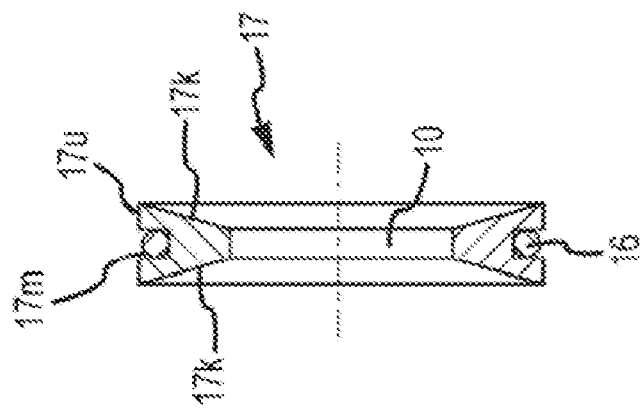
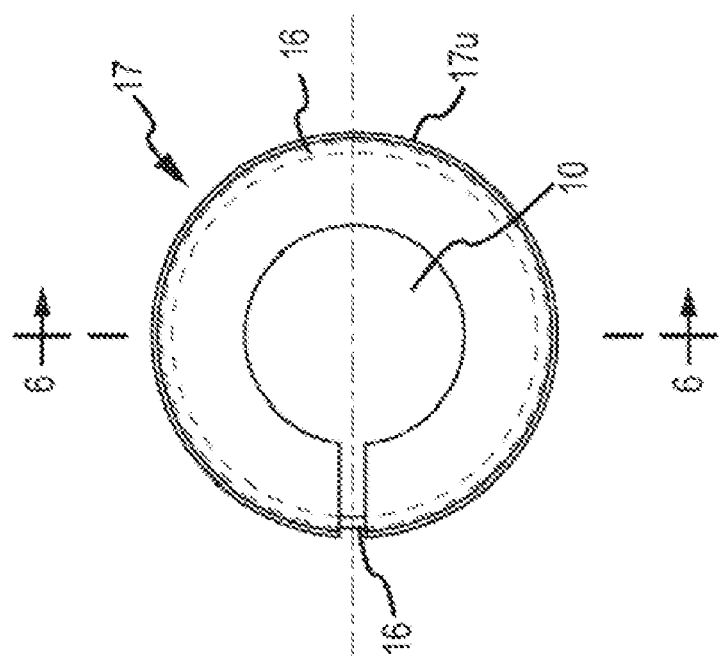

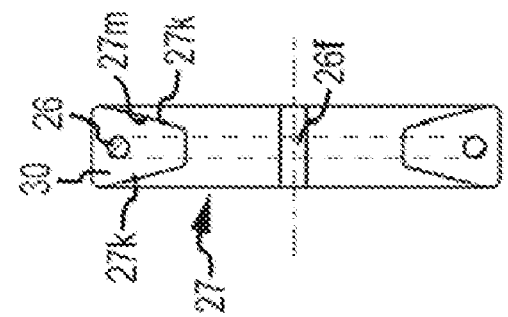
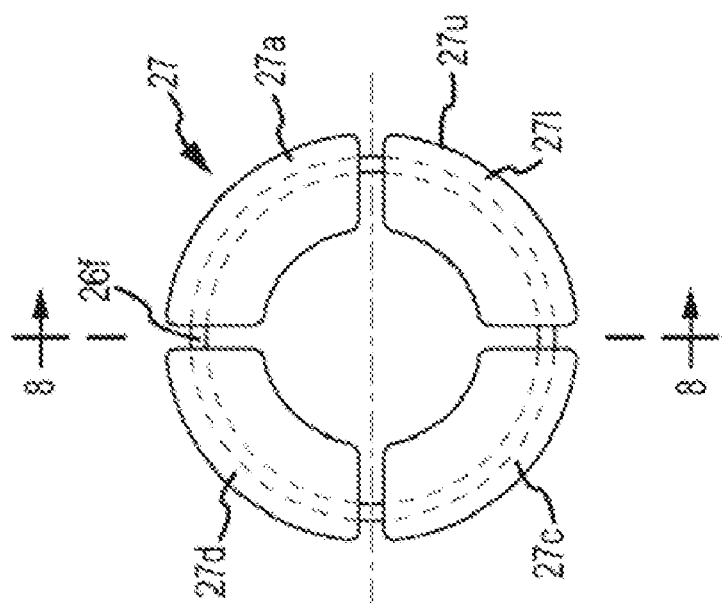

RACK AND PINION STEERING GEAR WITH AUTOMATIC ADJUSTMENT OF THE THRUST ELEMENT

BACKGROUND OF THE INVENTION

The instant application should be granted the priority dates of Apr. 4, 2006, the filing date, of the corresponding German Patent application DE 10 2006 016 110.6, as well as Jan. 25, 2007, the filing, date of the International patent application PCT/EP2007/000631.

The present invention relates to a rack and pinion steering gear having a thrust piece or element which can be inserted in a steering gear housing or box for pressing a rack and pinion against each other.

A generic rack and pinion steering gear is known from EP 1 507 694 B1. The thrust piece of this steering gear comprises a pressure element for abutment against the rack, and a guide element that is partially slotted and can be spread apart and extends along the cylindrical inner wall of the receiving space. A resilient element is arranged between a stop and the pressure element and at its outer side that faces the inner wall of the receiving space is surrounded by the guide element. When the pressure element moves in the direction of the stop the resilient element tends to yield or expand in the radial direction, whereby the guide element is spread apart against the receiving space. This construction is complicated. Moreover, the required contact pressure is not guaranteed over time owing to the resilient element.

The object of the present invention is to provide a rack and pinion steering gear which is simple in terms of construction and compensates for wear of the parts.

SUMMARY OF THE INVENTION

This object is achieved according to the invention by a rack and pinion steering gear that comprises a thrust element disposed in a housing for pressing a rack and pinion against one another, wherein one side of the thrust element is supported against the rack, and a second side of the support element is supported against a wedge-like part that is disposed in the housing and is formed of two semicircular annular elements, each of which is provided with at least one wedge surface that is disposed at an angle to a central plane of the wedge-like part, wherein a side of the wedge-like part remote from the thrust element is supported against a set screw, and wherein the thrust element and/or the set screw is provided with an inclined surface that cooperates with the at least one wedge surface of the annular elements of the wedge-like part.

The rack and pinion steering gear according to the invention is advantageously characterized in that adjustment of the thrust piece clearance, required as a result of wear, is automatically compensated for by the wedge-like part and swinging-up as well as the generation of noise at the thrust piece and rack and pinion teeth is avoided thereby.

Loading of the rack that results during driving is supported by the additional compression spring and also by the adjusting force of the wedge-like part that is loaded by the annular spring. In the event of high rack loading, in particular during parking, the conical end faces of thrust piece, set screw and the part that is wedge-like only in cross-section and is also in particular conical are spread further apart from each other until all parts as well as thrust piece and rack rest securely on each other and are compressed.

The wedge-like part is advantageously formed in two parts from two semicircular annular elements, wherein these elements have conical surfaces which cooperate with surfaces of the thrust piece and/or set screw that are also conical. The thickness of the annular elements decreases from the outside in, so the thrust piece and the set screw are driven apart by compression of the annular elements by way of the annular spring.

However it is of course possible to construct the wedge-like part in one piece (FIGS. 6 and 7) as well as in three or four parts (FIGS. 8 and 9). It must merely be ensured that a tensioning element causes the wedge-like part to attempt to change its radius in the direction of its wedge tip, i.e. to reduce its radius in the case of the wedge-like parts shown in the figures.

It is of course possible to configure the angular faces of the parts so as not to be rotationally symmetrical but to chose inclined, level or planar pressure surfaces. However, the rotationally symmetrical embodiment has the advantage that the parts do not tilt in the housing.

BRIEF DESCRIPTION OF THE DRAWINGS

One possible embodiment of the rack and pinion steering gear according to the invention will be described in more detail hereinafter with reference to the drawings, in which:

FIG. 5 shows a plan view of a wedge-like part constructed in one piece;

FIG. 6 shows a cross-section of a wedge-like part constructed in one piece with inserted annular spring;

FIG. 7 shows a plan view of a wedge-like part constructed in four pieces;

FIG. 8 shows a cross-section of a wedge-like part constructed in four pieces with cast-in annular spring.

DESCRIPTION OF PREFERRED EMBODIMENTS

Figure 1:
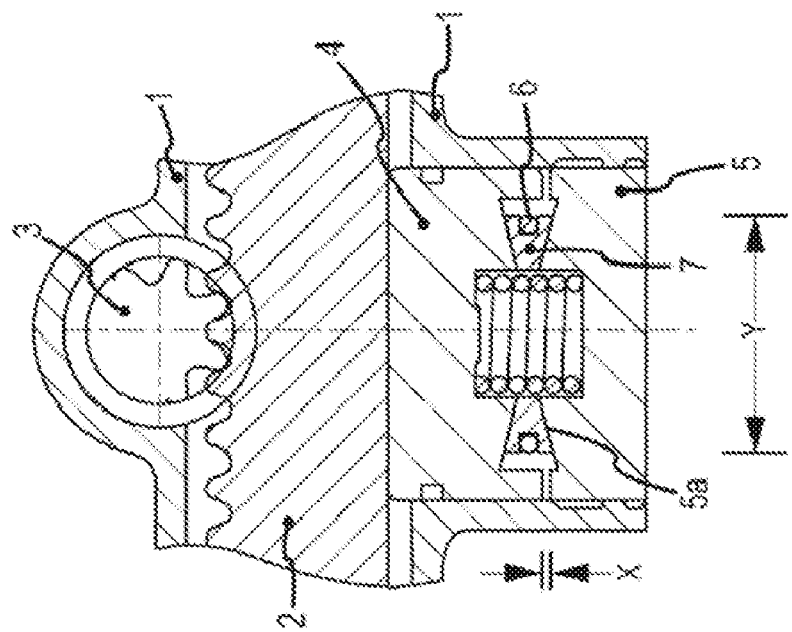
FIG. 1 shows a cross-section through a rack and pinion steering gear according to the invention after assembly.

FIG. 1 shows one possible embodiment of the invention in which the rack 2 is placed together with the pinion 3 in the housing 1. The rack 2 is pressurized against the pinion 3 by means of the thrust piece or element 4. The thrust piece 4 is placed together with the wedge-like part 7, the compression spring 8 and the set screw 5 in a recess of the housing 1. At its outer circumferential surface the set screw has an external thread 5b which cooperates with an internal thread of the housing. The thrust piece 4 is pressurized against the rack 2 via the compression spring 8 by screwing-in of the set screw 5, and the clearance x is adjusted between rack 2 and pinion 3. The compression spring 8 produces a defined pre-tensioning on the thrust piece 4 in the process.

The thrust piece 4 and the set screw 5 have conical angular faces 4a, 5a which cooperate with the conical surfaces 7k of the wedge-like part 7. The semicircular annular elements 7a and 7b form the wedge-like part 7. Due to the pressures of the set screw 5 and the thrust piece 4, the annular elements 7a and 7b are pressed apart to a distance or diameter y by the wedge surfaces, whereby the annular spring 6 is in turn pre-tensioned.

Figure 2:
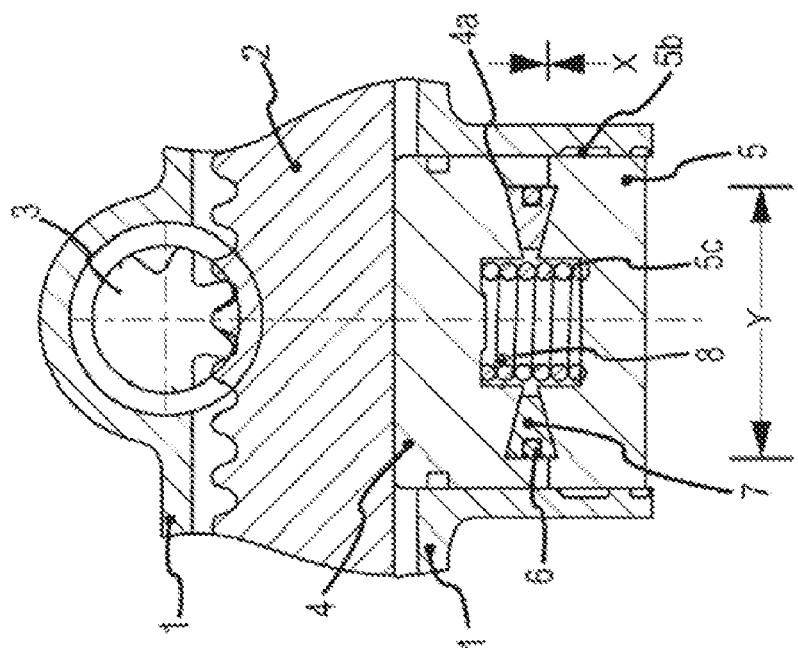
FIG. 2 shows a cross-section through a rack and pinion steering gear according to the invention following wear.

The clearance x between thrust piece 4 and set screw 5 is increased (FIG. 2) by wear that occurs over the life of the gear at the rack and pinion teeth and at the sliding inserts of the thrust piece 4. The annular elements 7a and 7b that are jointly pre-tensioned by the annular spring 6 reduce their spacing y owing to the wear, so that the conical angular faces 7k, 4a and 5a always rest against each other and are pressurized against each other. This prevents the parts from swinging toward each other.

Figure 4:
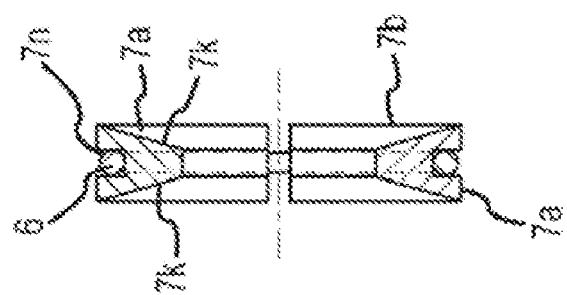
FIG. 4 shows a cross-section of a wedge-like part constructed in two pieces with inserted annular spring.
Figure 3:
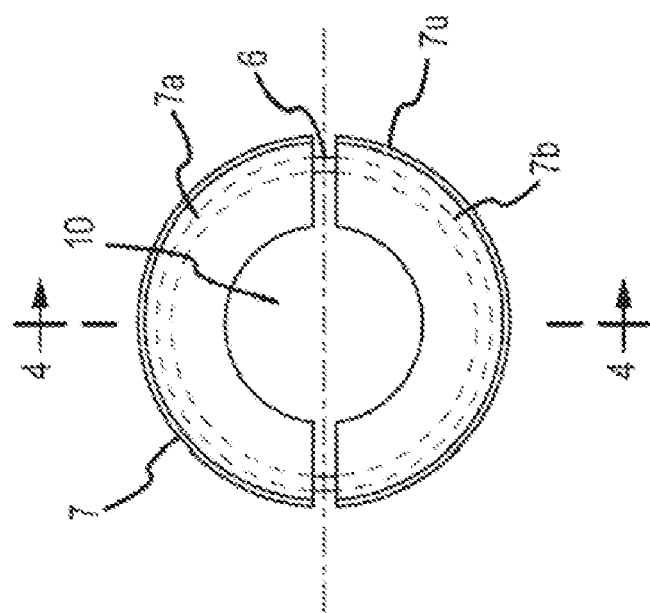
FIG. 3 shows a plan view of a wedge-like part constructed in two pieces.

FIG. 3 shows a plan view of the wedge-like part 7 and FIG. 4 shows it in cross-section. The annular elements 7a and 7b form an inner opening 10 in which the compression spring 8 is inserted. The annular spring 6 is inserted in a circumferential groove 7n which is arranged in the circumferential surface 7u. The incline of the conical angular faces 7k of the annular elements 7a, 7b should be constructed such that wear of the parts can be reliably compensated for over the life of the gear. With appropriate dimensioning of the annular spring 6 the compression spring 8 can be omitted. In this case the annular spring and the wedge-like part assume the function of the compression spring.

FIGS. 5 and 6 show a further possible embodiment of the wedge-like part 17. The part 17 is constructed in one piece, wherein it forms a ring which is slotted, so that the radius of the part 17 may be easily changed by means of the tensioning element 16, whereby the wedge-like part 17 can compensate for the varying distance between thrust piece 4 and set screw 5. The tensioning element 16 is in turn inserted in a circumferential groove 17n which is arranged in the circumferential surface 17u.

FIGS. 7 and 8 show a further embodiment of the wedge-like part 27, wherein this comprises four annular segments 27a to 27d into which the tensioning element 26 is cast. The exposed portions 26f of the tensioning element 26 act as springs which draw the individual annular segments 27a-27d toward each other, so that the radius of the wedge-like part 27 attempts to reduce itself as a result of the spring forces. The tensioning element 26 is cast into the annular segments 27a-27d in a V-shaped circumferential groove 27n by means of a casting compound 30.

The specification incorporates by reference the disclosure of German 10 2006 016 110.6 filed Apr. 4, 2006 and International application PCT/EP2007/000631 filed Jan. 25, 2007.

The present invention is, of course, in no way restricted to the specific disclosure of the specification and drawings, but also encompasses any modifications within the scope of the appended claims.

The invention claimed is:

1. A rack and pinion steering gear, comprising:
a housing;
a pinion disposed in said housing;
a rack disposed in said housing and adapted to be pressed against said pinion;
a thrust element disposed in said housing and adapted to press said rack and said pinion against one another, wherein a first side of said thrust element is supported against said rack;
a wedge-shaped part disposed in said housing and formed of two semicircular annular elements, each of which is provided with at least one wedge surface that is disposed at an angle to a central plane of said wedge-shaped part, wherein a second side of said thrust element is supported against said wedge-shaped part; and
a set screw disposed in said housing, wherein a side of said wedge-shaped part remote from said thrust element is supported against said set screw, and wherein at least one of said thrust element and said set screw is provided with an inclined surface that cooperates with said at least one wedge surface of said annular elements of said wedge-shaped part; a tensioning element that is adapted to apply pressure against said wedge-shaped part in a direction toward a center of said wedge-shaped part.

2. A rack and pinion steering gear according to claim 1, wherein said wedge-shaped part is is comprised of at least two pieces, and wherein said tensioning element is in the form of an annular spring and is adapted to apply pressure against said wedge-shaped part or said pieces thereof for reducing a radius formed by said wedge-shaped part.

3. A rack and pinion steering gear according to claim 1, wherein said wedge-shaped part is a c-shaped annular element that is provided with at least one wedge surface that is disposed at an angle to a central plane of said wedge-shaped part and that cooperates with said inclined surface of at least one of said thrust element and said set screw.

4. A rack and pinion steering gear according to claim 1, wherein said wedge surface and said inclined surface are conical.

5. A rack and pinion steering gear according to claim 1, wherein a radially outer peripheral surface of said annular elements of said wedge-shaped part is provided with a groove, and wherein said tensioning element is disposed in said groove.

6. A rack and pinion steering gear according to claim 1, wherein at least one tensioning element is cast into said wedge-shaped part, and wherein non cast-in portions of said tensioning element are traction elements or springs.

7. A rack and pinion steering gear according to claim 1, wherein said second side of said thrust element that is supported against said wedge-shaped part is inclined relative to a longitudinal axis of said thrust element.

8. A rack and pinion steering gear according to claim 1, wherein said second side of said thrust element that is supported against said wedge-shaped part has a conical configuration.

9. A rack and pinion steering gear according to claim 1, wherein a side of said set screw that rests against said wedge-shaped part is inclined relative to a direction in which said set screw is adapted to be threaded into said housing.

10. A rack and pinion steering gear according to claim 1, wherein a side of said set screw that is supported against said wedge-shaped part has a conical configuration.

11. A rack and pinion steering gear according to claim 1, wherein a compression spring is disposed between said thrust element and said set screw, and wherein said compression spring is adapted to urge said thrust element and said set screw apart.

12. A rack and pinion steering gear according to claim 11, wherein said compression spring is disposed between said annular elements of said wedge-shaped part or is embraced by said annular elements.

13. A rack and pinion steering gear according to claim 1, wherein said set screw, said wedge-shaped part, and said thrust element are embodied such that when first assembled in said housing, and a required thrust piece clearance is adjusted, said wedge-shaped part is adapted to be expanded as far as possible by said thrust element and said set screw to tension said tensioning element.

14. A rack and pinion steering gear, comprising:
a housing;
a pinion disposed in said housing;
a rack disposed in said housing and adapted to be pressed against said pinion;
a thrust element disposed in said housing and adapted to press said rack and said pinion against one another, wherein a first side of said thrust element is supported against said rack;

a wedge-shaped part disposed in said housing and formed of four quadrant shaped annular elements, each of which is provided with at least one wedge surface that is disposed at an angle to a central plane of said wedge-shaped part;

a set screw which is disposed in said housing, wherein a side of said wedge-shaped part remote from said thrust element is supported against said set screw, and wherein at least one of said thrust element and said set screw is provided with an inclined surface that cooperates with said at least one wedge surface of said annular elements of said wedge-shaped part;

a tensioning element that is adapted to apply pressure against said wedge-shaped part in a direction toward a center of said wedge-shaped part.

* * * * *